Aug. 28, 1934.   F. C. CROWE   1,972,009
LIGHT SENSITIVE CELL
Original Filed March 25, 1929

Inventor
Frederic C. Crowe
By
Attorney

Patented Aug. 28, 1934

1,972,009

UNITED STATES PATENT OFFICE 1,972,009

LIGHT-SENSITIVE CELL

Frederic C. Crowe, Erie, Pa., assignor of two-thirds to S. H. Cauley and C. L. Cauley, both of Erie, Pa.

Original application March 25, 1929, Serial No. 349,754, now Patent No. 1,762,470, dated June 10, 1930. Divided and this application May 10, 1930, Serial No. 451,483

9 Claims. (Cl. 175—41.5)

This invention relates to a novel light-sensitive element or condenser particularly adapted for use in the picture transmission system illustrated and described in my application Serial No. 349,754, filed March 25, 1929, Patented June 10, 1930, No. 1,762,470, of which the present application is a division.

Figure 1:
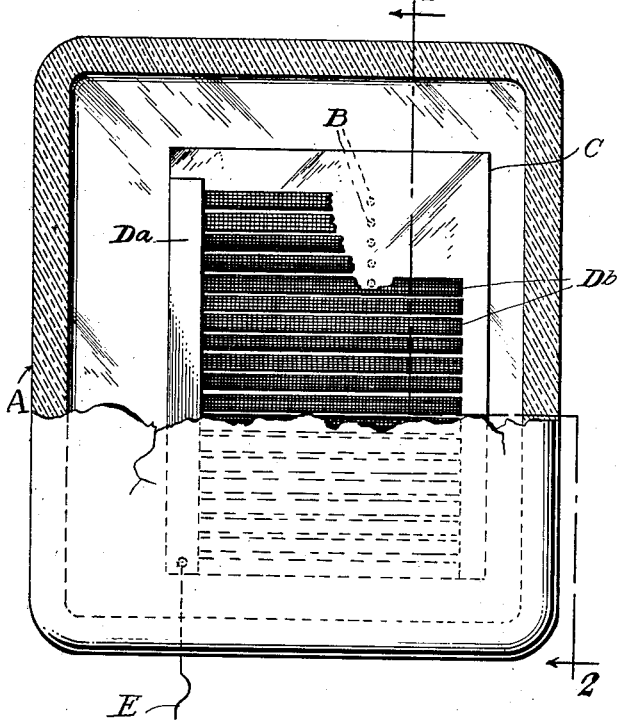
Figure 2:
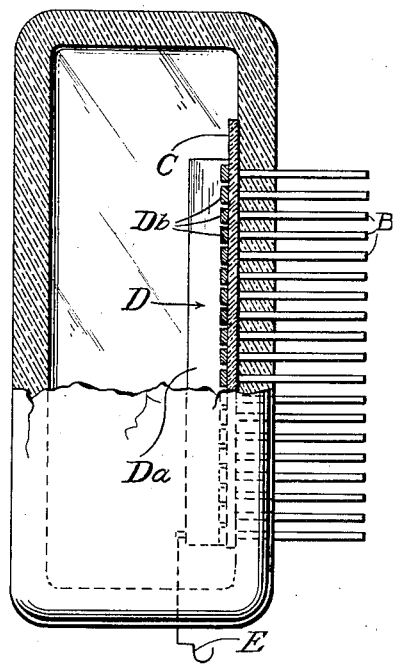
Figure 3:
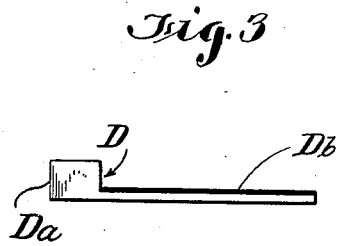
Figure 4:
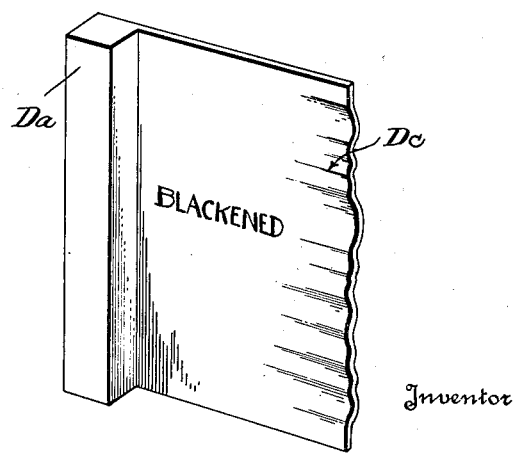

The present invention is illustrated in the accompanying drawing in which Fig. 1 is a front view, partly in section, of the novel light-sensitive cell employed in said system; Fig. 2 is a side view and section of Fig. 1 taken on the line 2—2 of that figure; Fig. 3 is an edge view of one of the elements shown in Fig. 1. Fig. 4 is a perspective of a modified form of electrode.

Referring to Figure 1, the light-sensitive cell employed in my system comprises a glass envelope A from which all air or gas has been evacuated to a high degree and in the back of which are sealed a number of fine wires B of square cross-section (see Figure 2). Wires B are arranged in a straight line extending from near the top of the cell to near the bottom, the wires being arranged close together, but insulated from each other. The ends of wires B are smoothed off even with the glass on the inside of the envelope. The wires are preferably square in cross-section and of very small dimension, for example, 40 gauge. A strip of mica is cemented to the back of envelope A over the ends of wire B. Supported on top of mica strip C is a comb like element D, which comprises a stiff back member Da and a plurality of thin tooth members Db formed integral with the back. The element D may also be a continuous piece without teeth, but of some elastic conductive material as shown at Dc in Fig. 4, just so a capacitive effect is formed. The mica may be omitted using only air as a dielectric but in this case the element D must be spaced far enough from the ends of wires B. It must be understood that D and B must be insulated from each other. The comb member may be made from spring brass, or some other metal having some spring to it, and the teeth are of very thin gauge. The comb element D is arranged so that each tooth of the comb is opposite and overlies the end of one of the wires B. A wire E is connected to the comb element D and is brought out of the envelope as one terminal of the cell. The exposed sides of the teeth of the comb are coated a dull black by any suitable process. Each wire B and the corresponding tooth of comb D constitute a small condenser. One terminal of all the condensers are connected together through the back of the comb element.

The action of the light-sensitive cell is as follows: When light falls on the blackened side of the teeth of the comb element, each tooth is pressed against the mica or where air is used as a dielectric, the tooth is pressed toward its opposite wire but without touching it with a tensity proportional to the amount of light falling upon it. If the light is strong, the tooth is pressed heavily against the mica, and the capacity is decreased. If the light ray is weak, the tooth will be pressed lightly and the capacity will be correspondingly greater. When varying intensities of light are impressed on D when D is one continuous elastic conductive substance various sections of D are depressed according to the amount of light, as indicated in Fig. 4.

The manner in which this light-sensitive cell is employed is fully disclosed in the application above referred to, but it may be used also in any apparatus or system, either television or otherwise. In other words it is capable of separate or other uses to which a light-sensitive cell or condenser is appropriate.

The two metallic elements may be used as two single pieces in some systems. By that I mean such a cell could be used in talking motion pictures.

I claim:

1. A light-responsive element comprising an electric condenser, one conducting plate of which is blackened and arranged to be exposed to light of varying intensity.

2. A light-responsive element comprising two spaced conducting elements, one of said elements being blackened on a surface arranged to be exposed to light.

3. A light-sensitive cell comprising a glass envelope, a light-sensitive electrode within said envelope, and adapted to be exposed to light, and a plurality of opposing electrodes insulated from said first electrode.

4. A light-sensitive cell comprising an envelope of insulating material, a number of electrodes extending through the wall of said envelope, a strip of insulating material covering the inner ends of said electrodes, and an inner electrode having a corresponding number of light-sensitive teeth resting against the insulating strip opposite the first mentioned electrodes respectively.

5. A light-sensitive cell comprising a transparent envelope of insulating material, a series of electrodes extending through the wall of said envelope, a strip of insulating material against the inner ends of said electrodes, and a comblike electrode having a series of thin, light-sensitive teeth resting against the side of the strip opposite the first mentioned electrodes respectively.

6. A light responsive cell comprising an envelope which has been evacuated to its greatest operating degree, a condenser in said envelope and means responsive to light rays for varying the spaced relationship between the elements of said condenser.

7. A device of the class described comprising a container, spaced conducting elements in said container and light responsive means for varying the spaced relationship between said elements.

8. A device of the class described comprising a transparent envelope, spaced conducting elements in said envelope and light responsive means for varying the spaced relationship between said elements.

9. A device of the class described comprising an envelope which has been evacuated to its greatest operating degree, spaced conducting elements in said envelope and light responsive means for varying the spaced relationship between said elements.

FREDERIC C. CROWE.